(12) United States Patent
Yamamoto et al.

(10) Patent No.: US 9,177,608 B2
(45) Date of Patent: Nov. 3, 2015

(54) OPTICAL DISC APPARATUS

(71) Applicant: Toshiba Alpine Automotive Technology Corporation, Iwaki-shi (JP)

(72) Inventors: Hiromichi Yamamoto, Fukushima-ken (JP); Hiroki Shimizu, Fukushima-ken (JP); Shingo Katagiri, Fukushima-ken (JP)

(73) Assignee: Toshiba Alpine Automotive Technology Corporation, Iwaki-shi (JP)

( * ) Notice: Subject to any disclaimer, the term of this patent is extended or adjusted under 35 U.S.C. 154(b) by 0 days.

(21) Appl. No.: 14/042,865

(22) Filed: Oct. 1, 2013

(65) Prior Publication Data

US 2014/0282631 A1 Sep. 18, 2014

(30) Foreign Application Priority Data

Mar. 15, 2013 (JP) .................................. 2013-052730

(51) Int. Cl.
*G11B 17/028* (2006.01)
*G11B 20/18* (2006.01)
*G11B 33/14* (2006.01)
*G11B 17/051* (2006.01)

(52) U.S. Cl.
CPC .......... *G11B 33/1446* (2013.01); *G11B 17/051* (2013.01)

(58) Field of Classification Search
CPC ........... G11B 7/00375; G11B 17/0282; G11B 17/0284; G11B 17/0515; G11B 17/056; G11B 17/0565; G11B 19/04; G11B 19/12; G11B 19/2009; G11B 2007/0013; G11B 2020/1826; G11B 20/1883; G11B 2220/20; G11B 2220/2541; G11B 23/0035; G11B 23/30; G11B 27/36; G11B 33/121; G11B 5/743; G11B 5/746; G11B 5/82; G11B 5/855; G11B 5/865; G11B 7/0053; G11B 7/00736; G11B 7/08505; G11B 7/08582; G11B 7/0948; G11B 7/095; G11B 7/1201; G11B 7/121; G11B 33/1446; G11B 33/0427; G11B 17/0281; G01N 21/9506
USPC ............ 250/559.45; 369/53.27, 53.41–53.42, 369/53.11–53.13, 53.15, 53.2, 53.22; 720/601, 626, 631, 645
See application file for complete search history.

(56) References Cited

U.S. PATENT DOCUMENTS

| | | | |
|---|---|---|---|
| 6,480,442 B1 * | 11/2002 | Nakatani et al. | 369/30.36 |
| 7,239,588 B2 * | 7/2007 | Gotoh et al. | 369/53.2 |
| 7,334,237 B2 * | 2/2008 | Hoshino | 720/601 |

(Continued)

FOREIGN PATENT DOCUMENTS

JP 2009-15996 1/2009

*Primary Examiner* — Dionne Pendleton
(74) *Attorney, Agent, or Firm* — Oblon, McClelland, Maier & Neustadt, L.L.P.

(57) ABSTRACT

According to one embodiment, there is provided an optical disc apparatus of a slot loading type, including a photosensor disposed near a disc insertion port and configured to change an output therefrom when an optical disc is inserted, a memory configured to record an output signal from the photosensor, and a controller configured to estimate a transparent clamp area of the optical disc based on the output signal, estimate a position of a center hole part of the optical disk based on the estimated clamp area, and detect presence of a foreign matter in the center hole part when a light-blocking percentage in the center hole part indicated by the output signal is equal to or higher than a predetermined value.

16 Claims, 9 Drawing Sheets

(56) References Cited

U.S. PATENT DOCUMENTS

| | | | |
|---|---|---|---|
| 2005/0155051 A1* | 7/2005 | Fukuyama et al. | 720/706 |
| 2009/0262621 A1* | 10/2009 | Saito et al. | 369/53.41 |
| 2009/0290477 A1* | 11/2009 | Sato | 369/112.23 |
| 2010/0226226 A1* | 9/2010 | Watanabe et al. | 369/53.2 |
| 2010/0246356 A1* | 9/2010 | Fariz et al. | 369/53.22 |
| 2013/0272107 A1* | 10/2013 | Erlach et al. | 369/270.1 |

* cited by examiner

Light-blocked area accounts
for 75%, and thus it is
determined that foreign
matter is present
11110011

OPTICAL DISC APPARATUS

CROSS-REFERENCE TO RELATED APPLICATIONS

This application is based upon and claims the benefit of priority from the prior Japanese Patent Application No. 2013-052730 filed on Mar. 15, 2013, the entire contents of which are incorporated herein by reference.

FIELD

Embodiments described herein relate generally to an optical disc apparatus that prevents entry of a foreign matter thereinto.

BACKGROUND

Presently, there are marketed reproducing apparatuses for optical discs, such as a Blu-Ray, a DVD, a CD, and the like, having a mechanism that uses a photosensor to detect disc insertion. In each of these apparatuses, when a disc is detected using the photosensor, the disc is introduced inside the apparatus using an insertion mechanism, and a center hole part of the disc is fixed to a disc rotation mechanism by applying pressure to allow the disc rotation mechanism to retain the disc.

However, if the center hole part is clogged with a foreign matter, the disc rotation mechanism cannot retain the disc normally, resulting in failing to reproduce the optical disc. Moreover, there is a possibility that a foreign matter entered with a previously inserted disc is left on a disc rotation table or an area around the table, which may prevent reproduction of even a normal disc.

Moreover, among vehicle-mounted optical disc reproduction apparatuses, there is known one having a configuration in which a roller is rotated by application of a certain voltage to move the disc to a position that can be retained by the rotation mechanism. However, a constant moving speed of the disc cannot be maintained depending on the way a user pushes the disc into an insertion port, user's timing of releasing the disc, environment temperature at the time of use of the optical disc reproduction apparatuses or due to adhesion of dirt to the roller.

This prevents the center hole part from being easily identified at the point of the photosensor during passage.

DETAILED DESCRIPTION

According to one embodiment, there is provided an optical disc apparatus of a slot loading type, including a photosensor disposed near a disc insertion port and configured to change an output therefrom when an optical disc is inserted, a memory configured to record an output signal from the photosensor, and a controller configured to estimate a transparent clamp area of the optical disc based on the output signal, estimate a position of a center hole part of the optical disk based on the estimated clamp area, and detect presence of a foreign matter in the center hole part when a light-blocking percentage in the center hole part indicated by the output signal is equal to or higher than a predetermined value.

Embodiments of the present invention will be described below with reference to the drawings. Throughout the drawings, the same reference numerals are used to designate the same components, and redundant descriptions thereof are omitted.

An optical disc apparatus according to the embodiments of the present invention is configured to detect presence of a foreign matter in a center hole part of an optical disc using a photosensor.

For example, so-called a cotton pad is used for retention of a packaged disc in a packaging case. That is, the disc is retained with the cotton pad fixed to the packaging case fitted into the disc center hole. The cotton pad is formed into, e.g., a cylindrical shape by layering soft cottons. In removing the disc from the packaging case, a user pulls the disc out of the cotton pad while pressing down the cotton pad. However, the cotton pad itself is not formed integrally with the packaging case, so that the disc may be removed from the packaging case with the cotton pad remaining in the disc center hole. When disc loading is performed in such a state, there may occur not only a disc loading failure due to presence of the foreign matter, but also entry of the foreign matter into the optical disc apparatus.

First Embodiment

Figure 1:
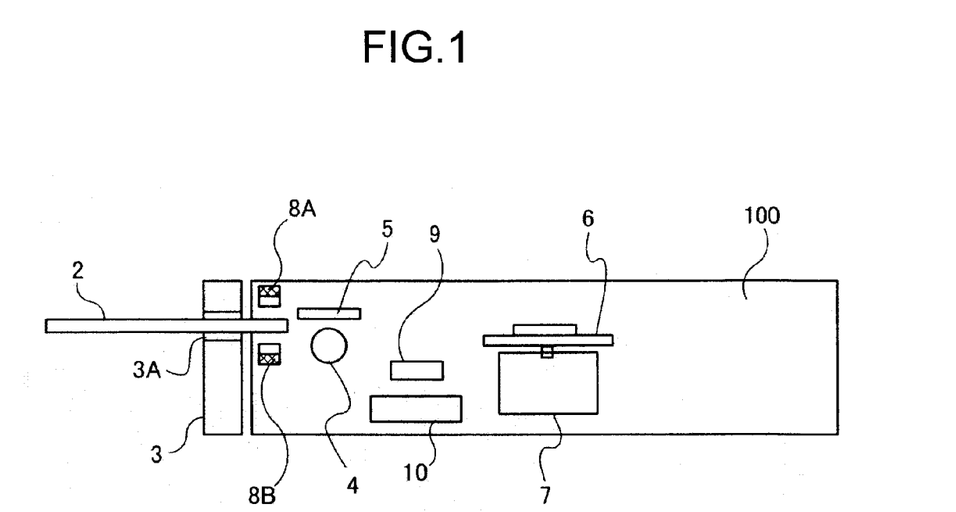
FIG. 1 is a schematic view illustrating a layout of an optical disc apparatus according to embodiments of the present invention.

FIG. 1 is a schematic view illustrating a layout of an optical disc apparatus according to the embodiments of the present invention. The optical disc apparatus can roughly be divided into a tray type, a slot type, and the like in terms of a disc insertion/ejection mechanism. An optical disc apparatus 100 according to the present embodiments is of a slot loading type, and a disc to be used in the optical disc apparatus 100 is an optical disc (hereinafter, sometimes referred to as merely "disc") such as a CD disc or a DVD disc.

As illustrated in FIG. 1, a disc 2 is inserted into the optical disc apparatus 100 through a disc insertion port 3A formed in a nose piece 3. The inserted disc 2 is conveyed, by a disc conveying mechanism including a conveying roller 4 and a guide member 5, to a position above a turn table 6. Subsequently, the disc 2 is chucked onto the turn table 6 by a chucking mechanism (not illustrated), and the turn table 6 is rotated by a spindle motor 7, followed by reproduction or recording of information.

A photosensor 8 including a light emitting element 8A and a light receiving element 8B is provided near the insertion port 3A and frontward of the disc conveying mechanism so as to detect the disc 2 inserted through the disc insertion port 3A. An output signal from the photosensor 8 is recorded in a memory 9.

A controller 10 estimates a transparent clamp area of the disc 2 based on the output signal of the photosensor 8 recorded in the memory 9. The controller 10 further estimates a position of a center hole part of the disc 2 from the estimated clamp area. When an opacity percentage indicated by a signal covering the center hole part is equal to or higher than a predetermined value, the controller detects presence of a foreign matter in the center hole part. Details of the detection control of the controller 10 will be described later.

Figure 2:
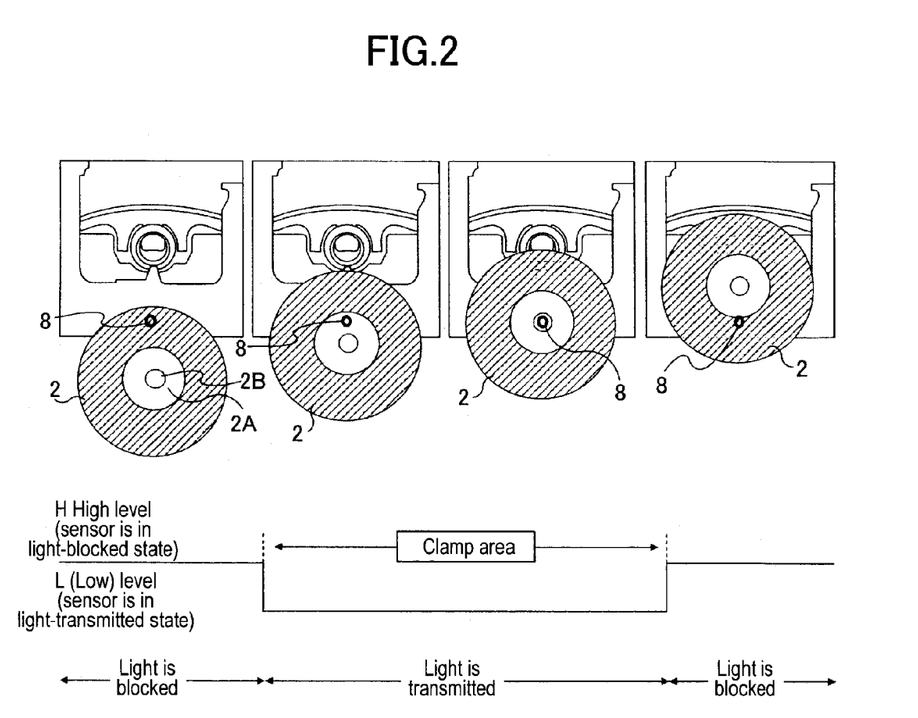
FIG. 2 is an exemplary view of an inside of the optical disc apparatus and a disc, which explains estimation of a clamp area of the disc.

FIG. 2 is an exemplary view of an inside of the optical disc apparatus and disc 2, which explains the estimation of the clamp area of the disc 2. On the disc 2 formed of resin such as polycarbonate, a lead-in area (not illustrated) in which information indicating how to use the disc 2 is provided inside a data area (not illustrated) of a recording layer formed of an aluminum reflective thin film. Inside the lead-in area, a transparent clamp area 2A for retention of the disc 2 is formed. Moreover, there is drilled, at a center portion of the clamp area 2A, a center hole part 2B, into/from which, for example, a shaft of the turn table 6 can be inserted/removed.

As illustrated in FIG. 1, the photosensor 8 for detecting the center hole part 2B of the disc is provided near the disc insertion port 3A. The photosensor 8 is configured to output a High level signal when light to a sensing section (not illustrated) of the light receiving element is blocked and to output a Low level signal when the light is transmitted to the sensing section.

When the disc 2 is inserted through the disc insertion port 3A and a leading end thereof reaches a position corresponding to the photosensor 8, the photosensor 8 is made to enter a light-blocked state by the data area which is opaque. When the disc 2 further proceeds inside the apparatus and the clamp area 2A which is transparent reaches the photosensor 8, the photosensor 8 is made to enter a light-transmitted state. The light-transmitted state continues from when the clamp area 2A reaches the photosensor 8, through a state where the center hole part 2B passes through the photo sensor 8, until an end point of the clamp area 2A passes through the photosensor 8. When the end point of the clamp area 2A passes through the photosensor and the opaque data area reaches once again the photosensor 8, the photo sensor 8 is made to enter the light-blocked state.

As is clear from FIG. 2, it can be estimated that the light-transmitted state of the photosensor 8 continues while the photosensor 8 is located in the clamp area 2A of the disc 2.

Figure 3:
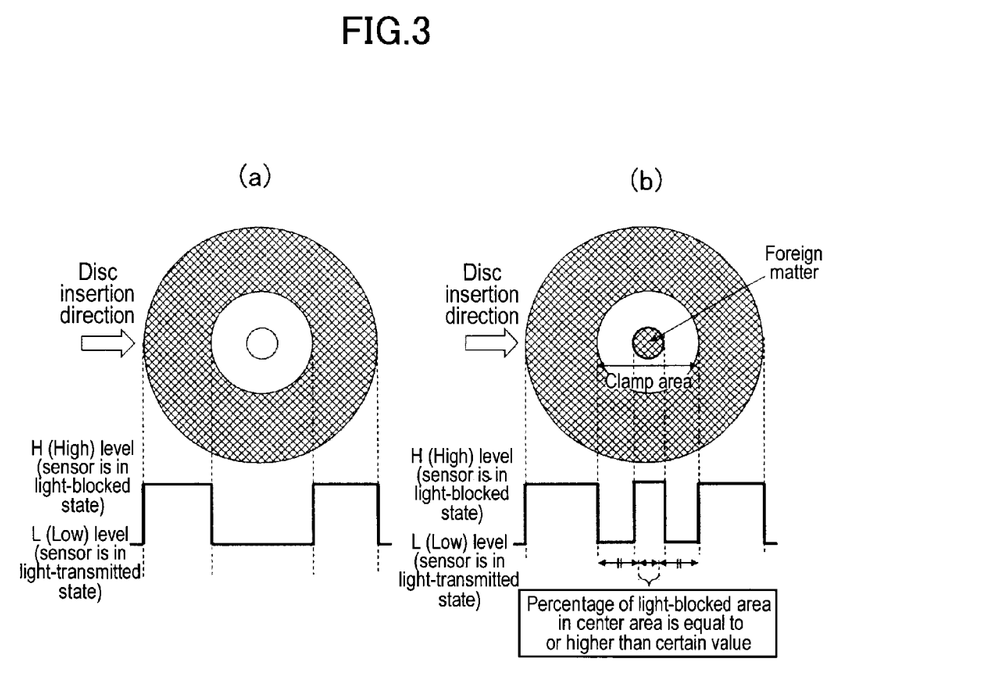
FIGS. 3A and 3B are views for explaining a detection mechanism for detecting a foreign matter present in a center hole part of the disc.

FIGS. 3A and 3B are views for explaining a detection mechanism for detecting the foreign matter in the center hole part 2B of the disc 2. FIG. 3A illustrates a change in an output level of the signal from the photosensor 8 when no foreign matter is present in the center hole part 2B at the time of insertion of the disc 2, and FIG. 3B illustrates a change in an output level of the signal from the photosensor 8 when the foreign matter is present in the center hole part 2B. As illustrated in FIG. 3B, an area of the center hole part 2B within the clamp area 2A (length of the clamp area in a radial direction) estimated in FIG. 2 is estimated. According to a specification of the disc 2, a diameter of the center hole part 2B is equal to or less than ⅓ of the clamp area 2A.

Thus, by equally dividing the estimated clamp area 2A into three areas in FIG. 3B, left area, center area, and right area, it is possible to estimate presence/absence of the foreign matter in the center area. That is, when an area (hereinafter, referred to as "light-blocked area") where the light to the photosensor 8 is blocked accounts for a certain percentage of the center area, it is possible to determine that the foreign matter is present in the center hole part 2B. For example, when the light-blocked area of the photosensor 8 accounts for 75% of the length of the center area, the presence of the foreign matter can be determined.

As described above, with a configuration in which the presence of the foreign matter is determined when the light-blocked area of the photosensor 8 accounts for a certain percentage or higher of the center area, it is possible to detect the presence of the foreign matter in the center hole part 2B even in cases where characters and the like are printed on the transparent clamp area 2A of the disc 2, where a label and the like are attached to the disc 2, and where the entire clamp area 2A of the disc 2 is not transparent.

<Foreign Matter Detection Processing>

Figure 4:
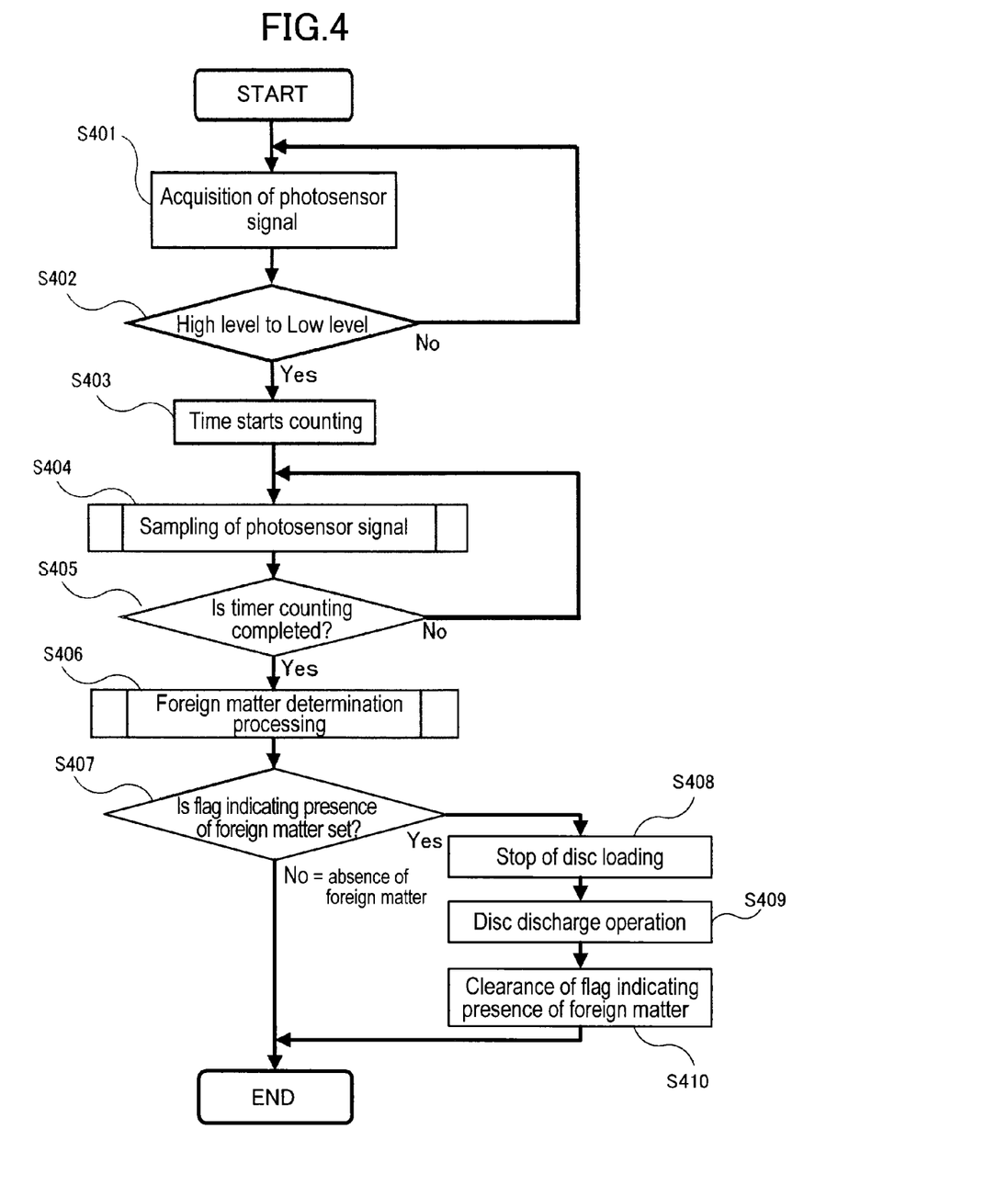
FIG. 4 is a flowchart illustrating a flow of foreign matter detection processing to be performed in the optical disc apparatus in the embodiments.

The following describes a flow of the foreign matter detection processing to be performed in the thus configured optical disc apparatus. FIG. 4 is a flowchart illustrating a flow of the foreign matter detection processing to be performed in the optical disc apparatus according to the embodiments.

First, a signal for center hole detection is acquired from the photosensor (step S401).

In consideration of stability of the signal of the photosensor 8, it is preferable that the acquisition of the signal of the photo sensor 8 is determined when a continuous signal detection of a predetermined time T1 sec or more is confirmed. For example, the predetermined time T1 is 8 msec.

Then, it is determined whether the signal of the photosensor 8 changes from the High level to Low level (step S402).

When the clamp area 2A of the disc 2 reaches the photosensor 8 and the change from the High level to Low level is confirmed (Yes in step S402), a timer is started (step S403). The timer is configured to count the length of the clamp area 2A of the disc 2 as a transit time. In a given optical disc apparatus, the length of the clamp area 2A is calculated in a substantially proportional manner from a time required from start to completion of the loading of the disc 2. For example, the timer counts 300 msec. When the change from the High level to Low level is not confirmed (No in step S402), a processing flow returns to step S401.

Then, sampling processing of the signal of the photosensor 8 is performed (step S404). Details of the sampling processing will be described later.

Then, it is determined whether the time counts a predetermined time, e.g., 300 msec (step S405).

When it is determined that the predetermined time is counted (Yes in S405), which means that the clamp area 2A has passed over the photosensor 8, so foreign matter determination processing is executed (step S406). Details of the foreign matter determination processing will be described later. When it is determined that the counting of the predetermined time is not completed (No in S405), the processing flow returns to step S404.

Then, it is determined whether a flag indicating the presence of the foreign matter is set (step S407). When the flag is not set (No in step S407), the foreign matter detection processing is ended.

On the other hand, when the flag indicating the presence of the foreign matter is set (Yes in step S407), the loading of the disc 2 is stopped (step S408), and discharge operation of the disc 2 is performed (step S409). Thereafter, the flag indicating the presence of the foreign matter is cleared (step S410), and the foreign matter detection processing is ended.

Figure 5:
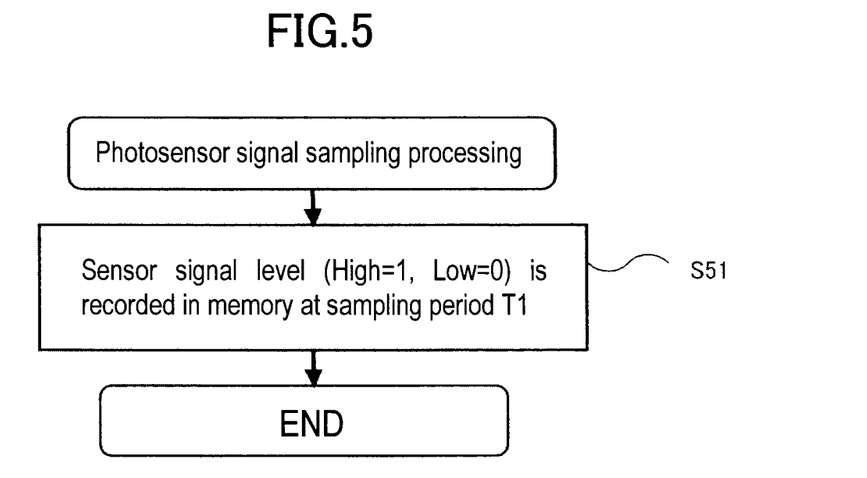
FIG. 5 is a flowchart illustrating a flow of sampling processing.
Figure 6:
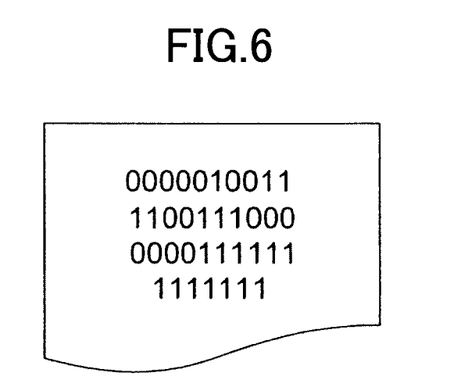
FIG. 6 is a view illustrating an example of a signal level recorded in a memory.

FIG. 5 is a flowchart illustrating a flow of the sampling processing. As illustrated in FIG. 5, the signal level of the photosensor 8 is recorded in series in the memory 9 at a sampling period T1 (step S51). FIG. 6 is a view illustrating an example of the signal level recorded in the memory 9, in which the High level and Low level are represented as 1 and 0, respectively. In the example of FIG. 6, the sampling is performed for 300 msec at a period of 8 msec, and 37-bit data is recorded in series.

Figure 7:
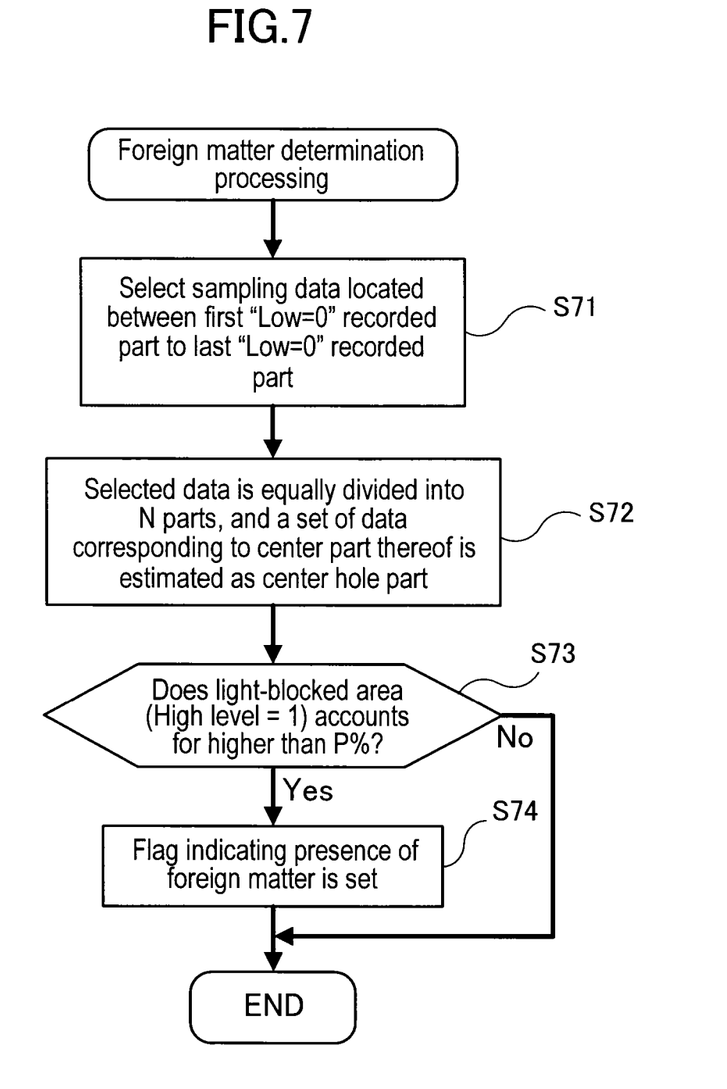
FIG. 7 is a flowchart illustrating a flow of foreign matter determination processing.
Figure 8:
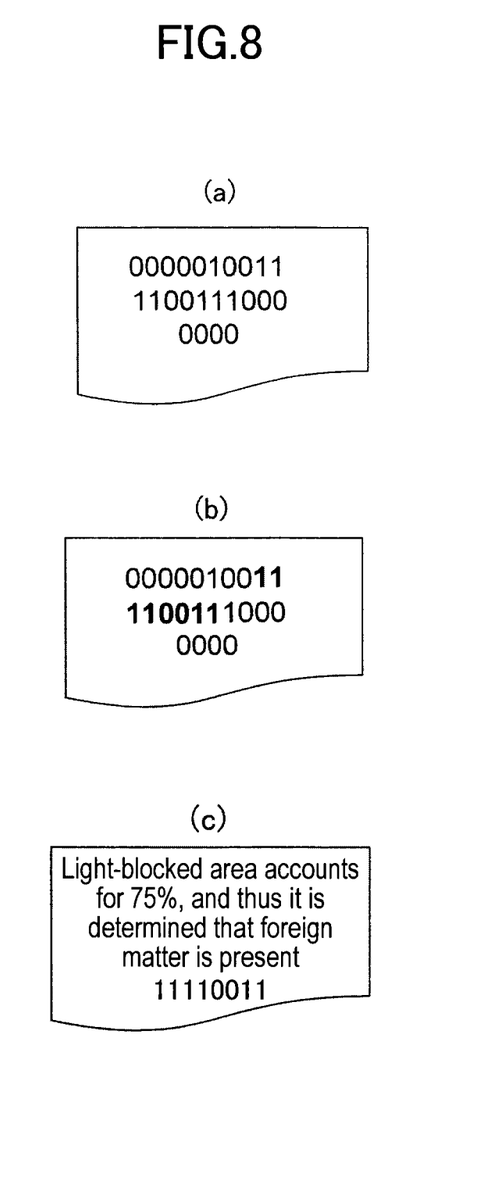
FIGS. 8A to 8C are views for explaining processing to be applied to sampling data indicating the signal level.

FIG. 7 is a flowchart illustrating a flow of the foreign matter determination processing, and FIGS. 8A to 8C are views for explaining processing to be applied to sampling data indicating the signal level.

First, sampling data recorded in the memory 9 is searched to select data located between a first "Low=0" recorded part to a last "Low=0" recorded part (step S71). The selected data is recognized as data corresponding to the length of the clamp area (see FIG. 8A).

Then, the selected data is equally divided into N parts, and a set of data corresponding to a center part thereof is estimated as the center hole part 2B (step S72). As described above, assuming that N=3, 8-bit data corresponding to the center hole part 2B is extracted (see FIG. 8B).

Then, it is determined whether data corresponding to the light-blocked area (High level=1) accounts for equal to or higher than P % (step S73). When the data corresponding to the light-blocked area accounts for equal to or higher than P % (Yes in step S73), the flag indicating the presence of the foreign matter is set (step S74), and the foreign matter determination processing is ended. When the data corresponding to the light-blocked area accounts for equal to or less than P % (No in step S73), the flag is not set, and the foreign matter determination processing is ended. The reason that a threshold value for determining the presence of the foreign matter is set to be equal to or higher than P % is that it is not adequate to determine "presence of foreign matter" based on an excessively small value.

In the example of FIG. 8C, 6 bits of the 8 bits, that is, 75% is High level, and thus it is determined that the foreign matter is present in the center hole part 2B.

Although the time counting is used to determine complete passage of the clamp area 2A in the above description, another photosensor signal or the like that can indicate the complete passage of the clamp area 2A over the photosensor 8 may be used.

According to the present embodiment, it is possible to detect the presence/absence of the foreign matter in the center hole part of the disc, thereby preventing entry of the foreign matter into the apparatus.

Second Embodiment

Next, a second embodiment will be described. An optical disc apparatus according to the second embodiment is also of the slot loading type and has basically the same configuration as that of the optical disc apparatus according to the first embodiment. In the second embodiment, the clamp area 2A and center hole part 2B are estimated from an outer diameter of the disc 2.

Figure 9:
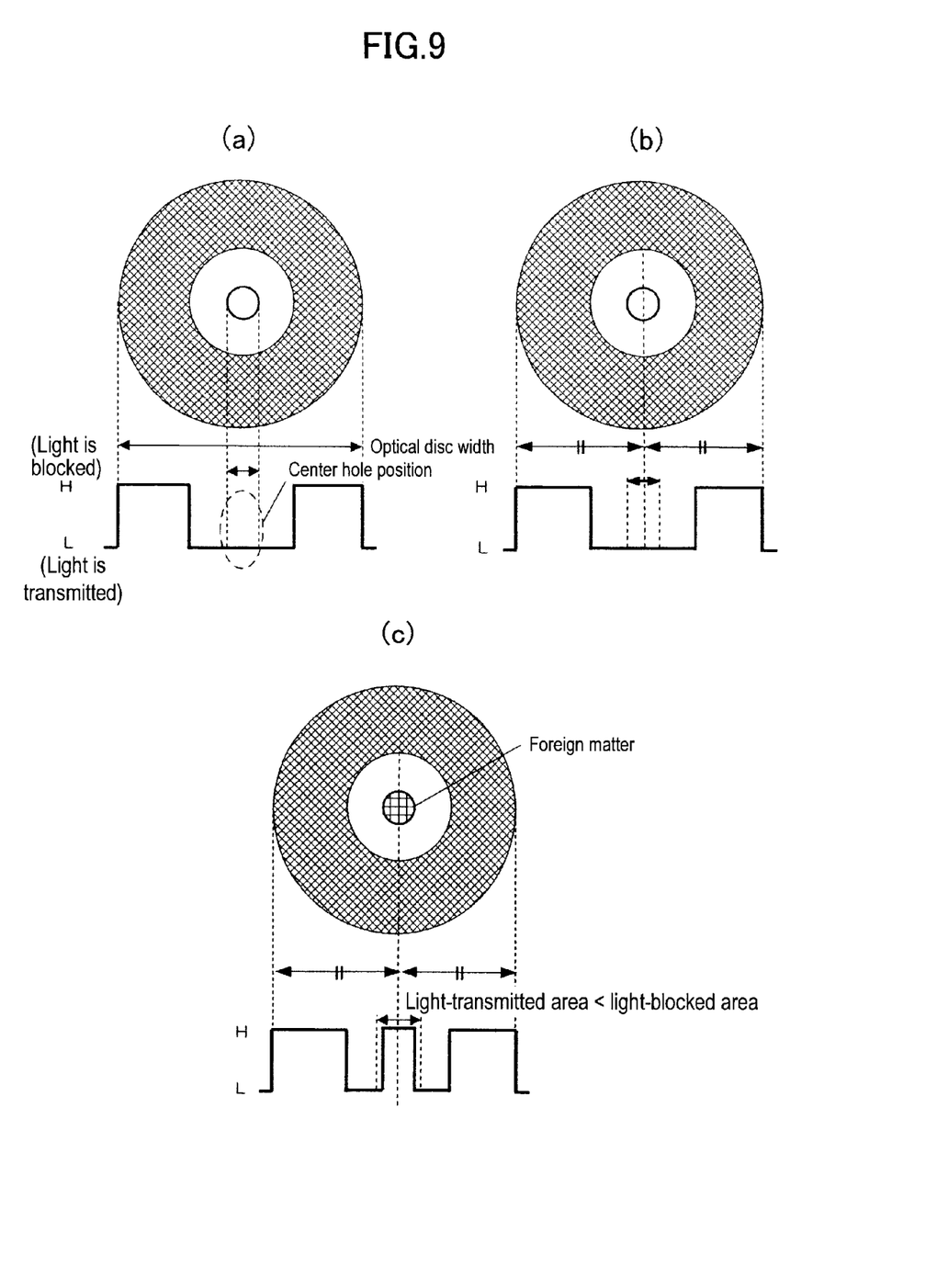
FIGS. 9A to 9C are views for explaining a detection mechanism for detecting the foreign matter present in the center hole part of the disc in a second embodiment.

FIG. 9 are views for explaining a detection mechanism for detecting the foreign matter present in the center hole part 2B of the disc 2 in the second embodiment. As illustrated in FIG. 9A, attention is focused on first and last change timings of a change pattern of the photosensor 8. A time length between the first and last change timings represents a width of the outer diameter of the disc 2. Thus, it can be assumed that a disc center position exists at a center area of the outer diameter of the disc 2. Since the center hole part 2B exists around the disc center portion, an area including the center hole part 2B is selected from the output signal of the photosensor 8.

Then, a percentage of the light-blocked area in the selected area is calculated (see FIG. 9B).

When the light-blocked area accounts for more than a predetermined value (e.g., equal to or higher than 75%), it is determined that the foreign matter is present in the center hole part 2B (see FIG. 9C), and the disc 2 is discharged. Generally, a size of the foreign matter is smaller than that of the center hole part 2B, so that the light-transmitted area is smaller than the light-blocked area as illustrated in FIG. 9C.

When the light-blocked area accounts for less than a predetermined value (e.g., equal to or lower than 25%), the disc 2 is mounted to the rotation mechanism.

In the manner as described above, the center hole part 2B is estimated from the outer diameter of the disc 2, and thus the presence/absence of the foreign matter can reliably be detected.

As described above, with a configuration in which the center hole part is estimated from the outer diameter of the disc and the presence of the foreign matter is determined when the light-blocked area of the photosensor 8 accounts for a certain percentage or higher of the center portion, it is possible to detect the presence of the foreign matter in the center hole part even in cases where characters and the like are printed on the transparent clamp area of the disc, where a label and the like are attached to the disc, and where the entire clamp area of the disc is not transparent.

Figure 10:
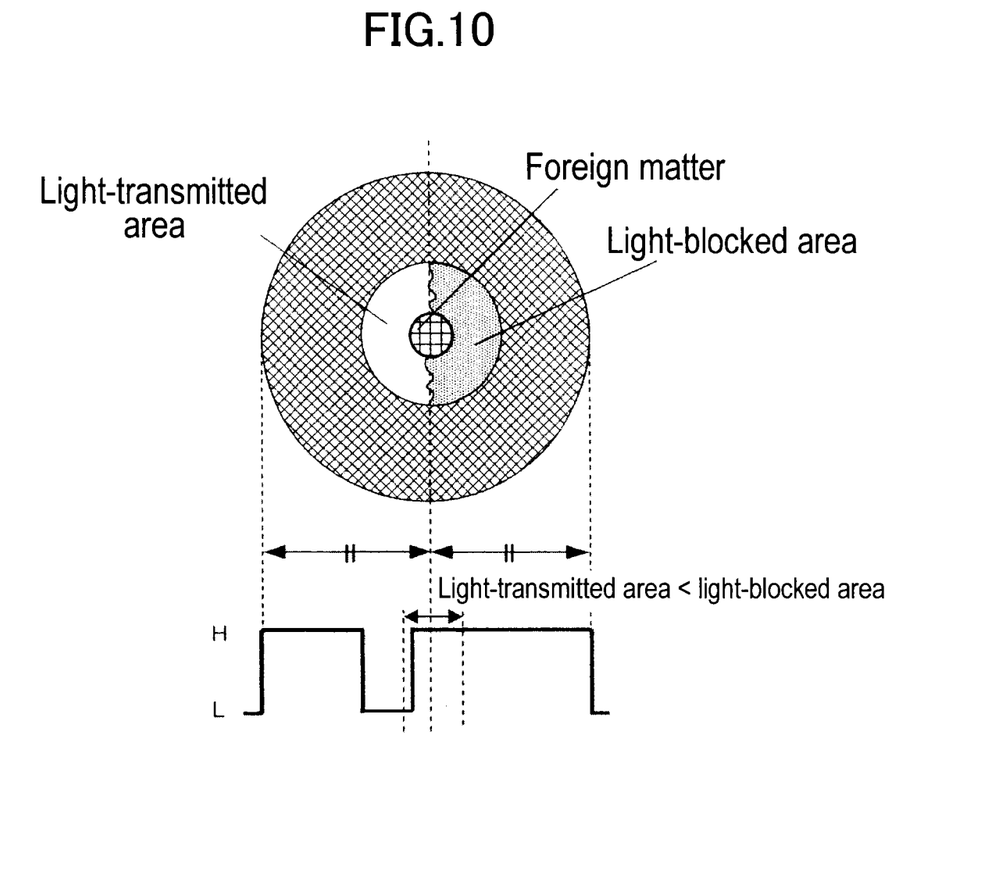
FIG. 10 is a view for explaining the foreign matter detection for a disc in which a shape of the center hole part is not circle.

FIG. 10 is a view for explaining the foreign matter detection for a disc 2 in which a shape of the center hole part 2B is not circle. As illustrated in FIG. 10, the light-transmitted area is smaller than the light-blocked area, and thus the presence of the foreign matter in the center hole part can be detected even in the disc 2 in which the shape of the center hole part 2B is not circle.

According to the present embodiment, it is possible to estimate the position of the center hole part from the outer diameter of the optical disc and to detect the presence/absence of the foreign matter in the center hole, thereby preventing entry of the foreign matter into the apparatus.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical disc apparatus of a slot loading type, comprising:
a photosensor disposed near a disc insertion port and past which a center hole of an optical disc passes, and that is configured to change an output therefrom when the optical disc is inserted;
a memory configured to record an output signal from the photosensor; and
a controller configured to estimate a transparent clamp area of the optical disc based on the output signal, estimate a position of the center hole of the optical disc based on the estimated clamp area, and detect presence of a foreign matter in the center hole when a light-blocking percentage in the center hole indicated by the output signal is equal to or higher than a predetermined value.

2. The optical disc apparatus according to claim 1, wherein the photosensor outputs a High level signal when light to a sensing section thereof is blocked and outputs a Low level when light is transmitted to the sensing section, and data located between a first Low level recorded part appearing in the output signal to a last Low level recorded part thereof is recognized as data corresponding to the clamp area.

3. The optical disc apparatus according to claim 2, wherein the output signal of the photosensor recognized as the clamp area is equally divided into three areas, and an output signal corresponding to a center of the three areas is recognized as the center hole.

4. The optical disc apparatus according to claim 3, wherein the predetermined value is equal to or higher than 75%.

5. The optical disc apparatus according to claim 4, wherein when the presence of the foreign matter is detected in the center hole, loading of the optical disc is stopped, and then discharge operation of the disc is performed.

6. The optical disc apparatus according to claim 2, wherein the predetermined value is equal to or higher than 75%.

7. The optical disc apparatus according to claim 6, wherein when the presence of the foreign matter is detected in the center hole, loading of the optical disc is stopped, and then discharge operation of the disc is performed.

8. The optical disc apparatus according to claim 2, wherein when the presence of the foreign matter is detected in the center hole, loading of the optical disc is stopped, and then discharge operation of the disc is performed.

9. The optical disc apparatus according to claim 3, wherein when the presence of the foreign matter is detected in the center hole, loading of the optical disc is stopped, and then discharge operation of the disc is performed.

10. The optical disc apparatus according to claim 1, wherein the predetermined value is equal to or higher than 75%.

11. The optical disc apparatus according to claim 10, wherein when the presence of the foreign matter is detected in the center hole, loading of the optical disc is stopped, and then discharge operation of the disc is performed.

12. The optical disc apparatus according to claim 1, wherein when the presence of the foreign matter is detected in the center hole, loading of the optical disc is stopped, and then discharge operation of the disc is performed.

13. An optical disc apparatus of a slot loading type, comprising:
a photosensor disposed near a disc insertion port and past which a center hole of an optical disc passes, and that is configured to change an output therefrom when an optical disc is inserted;
a memory configured to record an output signal from the photosensor; and
a controller configured to estimate an outer diameter and a center position of the optical disc, select an area around the estimated center position as an area including the center hole, and detect presence of a foreign matter in the center hole when a light-blocking percentage in the selected area indicated by the output signal is equal to or higher than a predetermined value.

14. The optical disc apparatus according to claim 13, wherein when the presence of the foreign matter is detected in the center hole, loading of the optical disc is stopped, and then discharge operation of the disc is performed.

15. The optical disc apparatus according to claim 13, wherein the photosensor outputs a High level signal when light to a sensing section thereof is blocked and outputs a Low level when light is transmitted to the sensing section.

16. The optical disc apparatus according to claim 15, wherein when the presence of the foreign matter is detected in the center hole, loading of the optical disc is stopped, and then discharge operation of the disc is performed.

* * * * *